United States Patent [19]

Shivvers et al.

[11] Patent Number: 4,845,949
[45] Date of Patent: Jul. 11, 1989

[54] PARKING BRAKE FOR INTEGRATED TRANSMISSION

[75] Inventors: Charles C. Shivvers; Steven D. Shivvers, both of Corydon; Richard A. Arnold, Humeston; Edward A. Ryks, Corydon, all of Iowa

[73] Assignee: Shivvers, Inc., Corydon, Iowa

[21] Appl. No.: 122,339

[22] Filed: Nov. 18, 1987

[51] Int. Cl.$^4$ ............................................. F16D 31/02
[52] U.S. Cl. ........................................ 60/436; 60/442; 60/487; 60/489; 74/60; 92/12.2; 180/6.48
[58] Field of Search ................. 60/487, 488, 489, 490, 60/491, 492, 494, 468, 435, 436, 442, 406; 92/12.2, 13.7, 71, 147; 91/506, 505; 180/6.48, 272; 74/60, 839

[56] References Cited

U.S. PATENT DOCUMENTS

| | | |
|---|---|---|
| 2,114,076 | 4/1938 | Golz . |
| 2,562,363 | 7/1951 | Nixon . |
| 2,662,374 | 12/1953 | Wodyt . |
| 2,844,002 | 7/1958 | Pavesi . |
| 3,131,539 | 5/1964 | Creighton et al. ..................... 60/487 |
| 3,188,810 | 6/1965 | Kuze . |
| 3,747,476 | 7/1973 | Ankeny et al. . |
| 3,749,195 | 7/1973 | Vegners . |
| 3,750,406 | 8/1973 | Verlinde et al. ..................... 60/442 |
| 3,783,611 | 1/1974 | Bojas . |
| 3,795,107 | 3/1974 | Ward . |
| 3,795,109 | 3/1974 | Bojas et al. . |
| 3,800,535 | 4/1974 | Ward et al. . |
| 3,812,925 | 5/1974 | Lauck et al. . |
| 3,831,497 | 8/1974 | Trabbic et al. . |
| 3,855,792 | 12/1974 | Bojas et al. . |
| 3,864,051 | 11/1974 | McDermott . |
| 3,912,033 | 10/1975 | Ancel . |
| 4,041,703 | 8/1977 | Knapp . |
| 4,046,029 | 9/1977 | Sugden . |
| 4,050,247 | 9/1977 | Connett . |
| 4,189,921 | 2/1980 | Knapp . |
| 4,213,744 | 7/1980 | Davis et al. . |
| 4,274,505 | 6/1981 | Maust ................................. 60/487 X |
| 4,317,331 | 3/1982 | Aruga et al. ..................... 60/442 X |

OTHER PUBLICATIONS

Eaton, Model 6, 7 and 11 Hydrostatic Transmissions/-Model 11 Pump, Eaton Corp., date of pub. 3/1985.
40° Motors, Sundstrand Corp. published 1983.
Hydura Type PVW Variable Delivery Pumps, pages from brochure/ad on Hydura Axial Piston-Pump, date of publication believed to be 1982.

Primary Examiner—Edward K. Look
Attorney, Agent, or Firm—Litman, McMahon & Brown

[57] ABSTRACT

A vehicle includes at least a pair of drive wheels, each wheel being independently controlled by an integrated transmission, each transmission being powered by an input shaft operably driven by a common engine. Each transmission is of a type wherein a pump head with pistons is driven by the input shaft and conveys output fluid to a motor head which is driven thereby and rotates and output shaft. Pump head output is controlled by an operator variable swash plate. The transmission integrally includes a dampening mechanism for the swash plate, a positive neutral structure for the swash plate, an automatic parking brake with override mechanism to allow setting of the brake or release of the brake by the operator, a porting block communicating fluid flow between the pump heads and providing for overpressure relief, and a charge pump for communicating makeup fluid to the pump head and to circulate the fluid so as to cool same. The transmission also includes structure to provide for substantial internal gear reduction even at full output speeds.

19 Claims, 7 Drawing Sheets

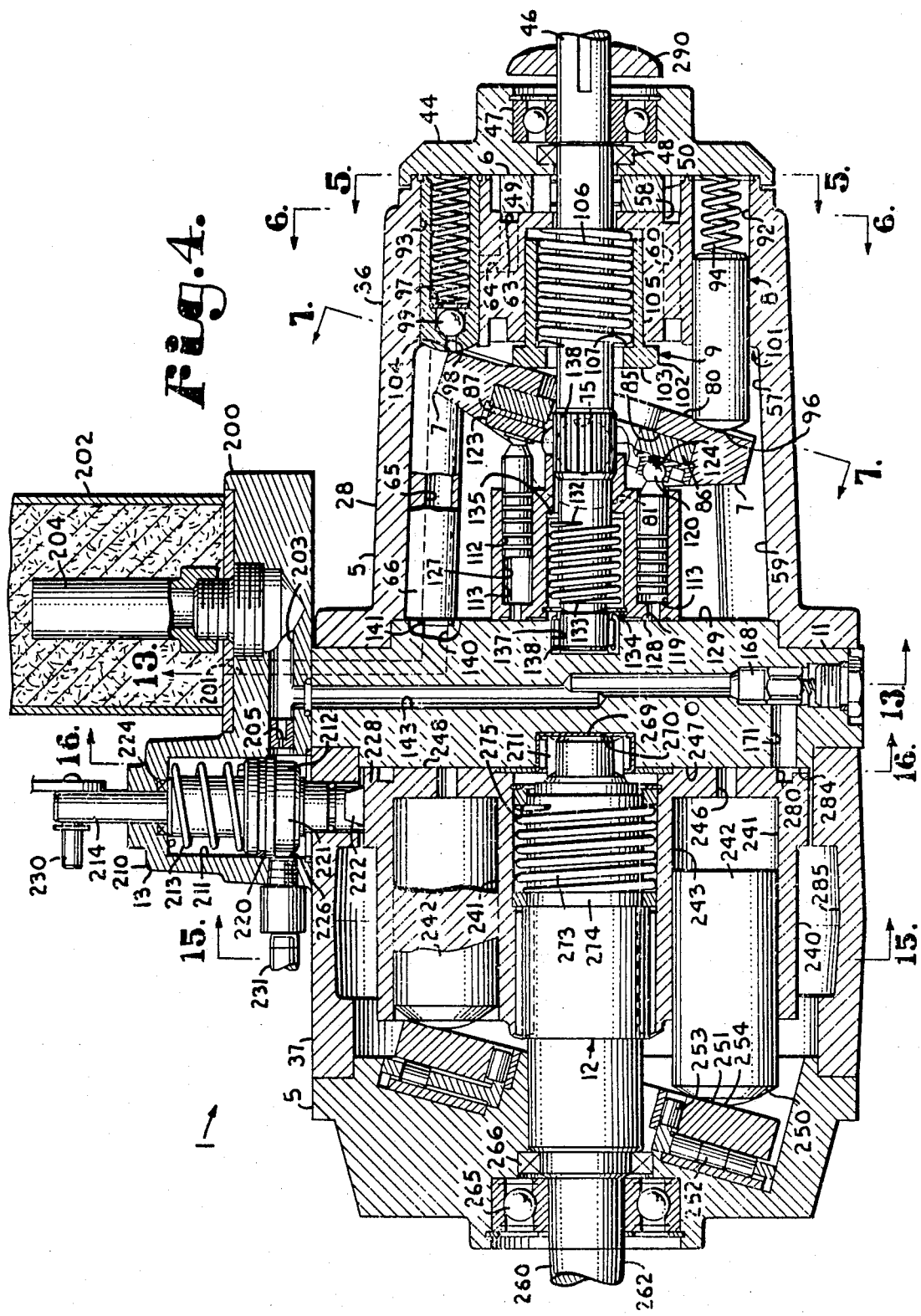

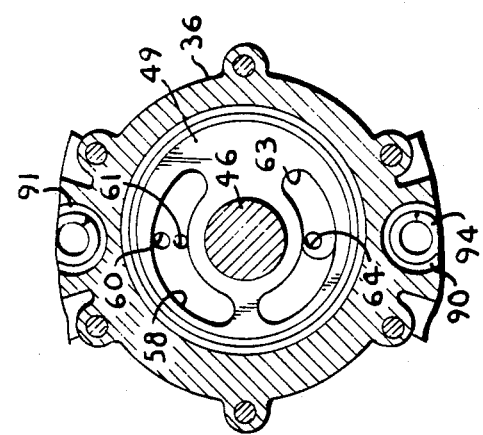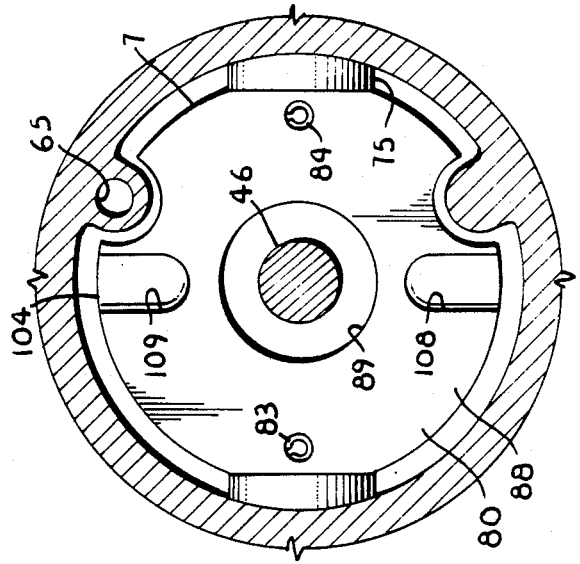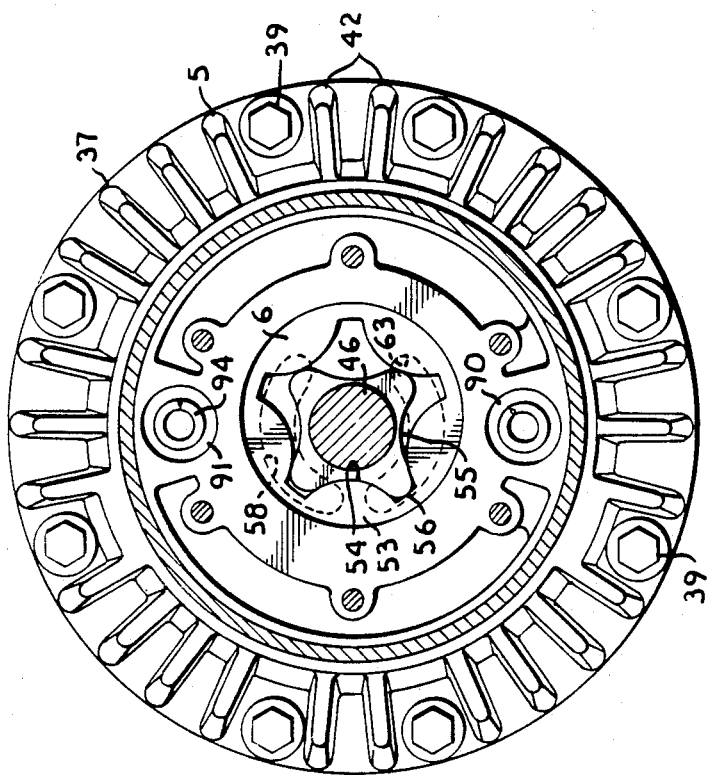

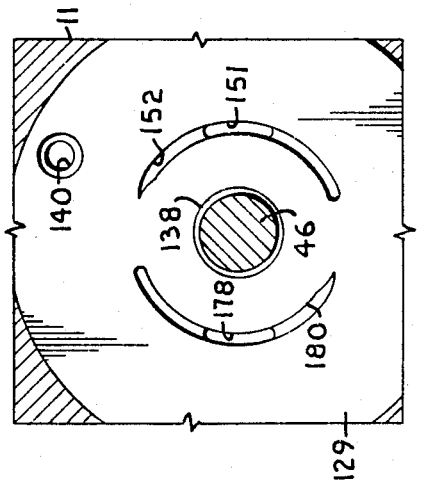
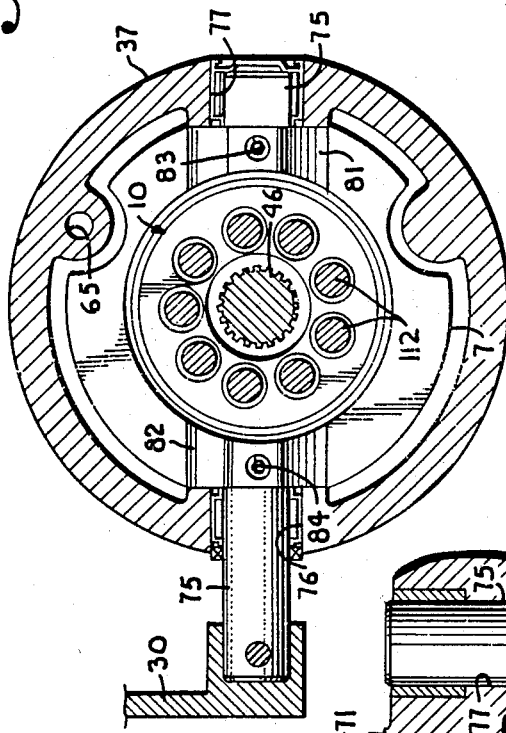
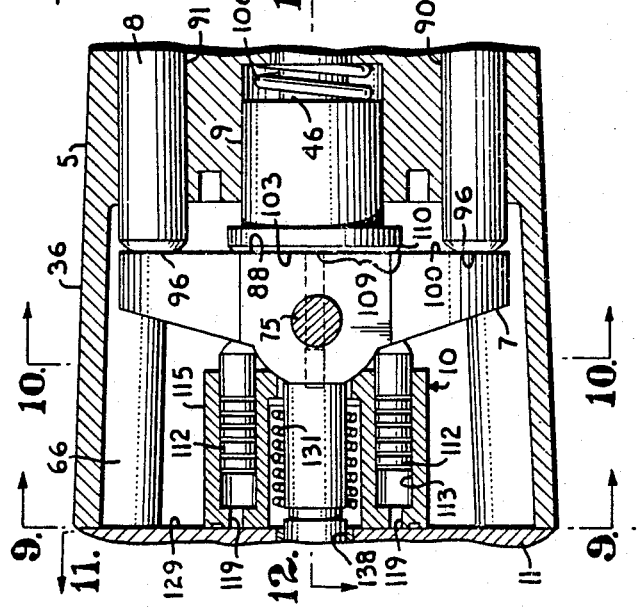
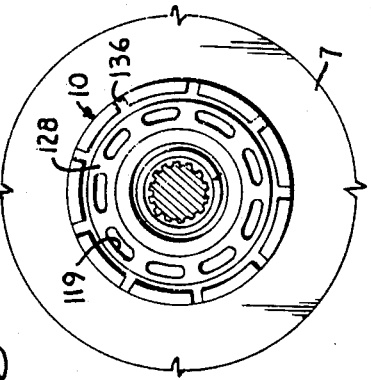

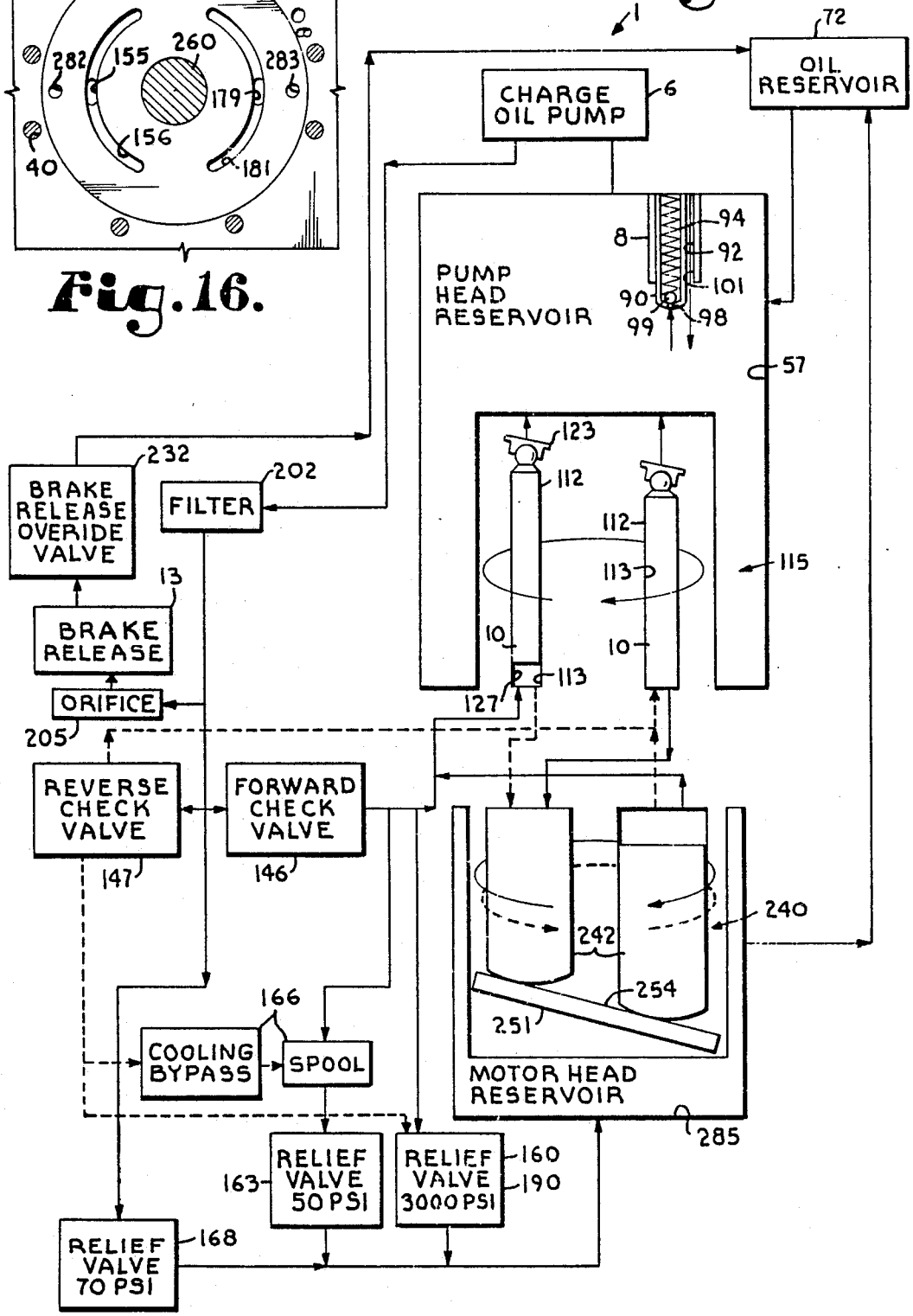

PARKING BRAKE FOR INTEGRATED TRANSMISSION

BACKGROUND OF THE INVENTION

The present invention relates to a hydraulic transmission for varying the speed of an output shaft in comparison to an input shaft and, in particular, to a hydraulic transmission of the type utilized to independently control the speed and rotational direction of multiple wheels on a vehicle.

Many hydraulic transmissions have been previously designed which allow an operator to infinitely vary the output of the transmission or even to reverse the output of the transmission as compared to the input. Normally, this has been accomplished by use of a swash plate which is either manually operated by the operator or hydraulically motivated to vary flow of hydraulic fluid through a rotating pump head having axially moving pistons. The flow of hydraulic fluid from the pump head pistons, in turn, rotates a motor head by motivating a corresponding set of pistons therein acting against a fixed cam and, consequently, rotates an output axle attached to the motor head.

Typically, the prior art transmissions have been provided with various features such as gear reduction, brake setting equipment and the like. Unfortunately, these features are usually provided external of the transmission and significantly add to the volume and mass of the overall apparatus. Applicants determined that it was quite desirable to have an integrated transmission wherein substantially all of these necessary or desirable functions could be provided internally in the transmission, while also producing a highly effective and quite efficient transmission.

In particular, transmissions of this type are frequently used on equipment such as "zero turning radius" lawn-mowers and the like wherein a potentially dangerous situation confronts the operator, bystander and the equipment itself if the device us allowed to continue to be propelled should the operator release the controls, as when the operator is inadvertently thrown from the device or becomes injured. Therefore, a "deadman" mechanism is often provided for automatically returning the transmission to a neutral configuration in such a situation such that the device does not continue to be powered, if the controls are released.

Previous transmissions of this type have generally relied on some kind of external device such as counter-operating biasing springs which are designed to return the operator control shaft to a neutral position should the operator release the shaft. External devices of this type can be easily tampered with by a user or damaged. Integration of such a return to neutral function into the transmission itself allows for a reduction in external parts which can be damaged or inappropriately removed and substantially reduces the external structure required to support various features of the transmission.

Another problem frequently encountered in transmissions of this type for use in lawnmowers and the like is that operation tends to be somewhat jerky or bouncy, as the operator is usually unable to smoothly control the transition from one speed to another and often attempts to make abrupt changes. Vibration from such jerky operation has a tendency to wear more heavily on the machine and the operator as well. Consequently, it is desirable to dampen the output of such a transmission to prevent such jerky motion.

Not only is it desirable to be able to have a return to neutral function, as described above, but it is also desirable for the operator to have a positive feel for the neutral position, whether the operator is moving from neutral to forward or from neutral to reverse. This feature is referred to herein as a positive neutral function and, in general, the feature requires that the operator extend more energy or movement in converting from the neutral orientation of the transmission to either a forward or reverse orientation, as compared to the amount of energy expended or movement required to transfer from one speed to another in a particular direction. As with the other features noted above, it is desirable that the structure required to provide this feature be incorporated within the transmission itself.

For reasons of convenience and simplicity, it is preferable that the transmission receive power directly from the motor drive train without passing through gear reduction apparatus. Unfortunately, most output requirements are such that the output rotational speed must be substantially reduced as compared to the input rotational speed taken directly from the motor. Consequently, it is further desirable that the transmission incorporate an internal gear reduction system allowing for a substantial reduction in output speed as compared to input speed, even when the hydrostatic transmission of the type having axially moving pistons driving the output motor is oriented to provide the maximum output speed. (It is noted that at some lower than maximum output speeds, virtually all variable output transmissions inherently provide some gear reduction because of power bypass of one type or another, but none of the prior art transmissions known to applicants provide a substantial internal gear reduction at full output).

Certain of the vehicles utilizing transmissions of this type include brakes which effectively prevent the vehicle from moving when the motor driving the transmission is stopped. These brakes are usually manually applied and require a substantial amount of structure mounted on the vehicle. In particular, parking brakes of this type have usually included an operator lever arm with an associated linkage connecting the lever arm to a brake mechanism which, in turn, locks the drive wheels, drive shaft or the like. Again, to simplify this structure and to integrate the braking function into the transmission, it was deemed desirable by applicants to construct a transmission which would have internal structure to automatically engage a parking brake when the motor driving the transmission was stopped.

While a parking brake of this type is highly advantageous, it is also necessary to provide such a brake with an override structure which will allow the operator to selectively override the brake; for example, where the operator wishes to push the vehicle to a different position when the motor will not start. Further, it is advantageous to have a braking system of this type which allows the operator to selectively engage the brake when the motor is operating. This allows the operator to dismount from the vehicle while the motor is running without fear of the vehicle rolling downhill or the like.

Applicants also deemed it desirable to provide a porting block mountable between the pump head and motor head of the transmission which would incorporate necessary flow channels, check valves and the like to very effectively and simply provide for flow of fluid about the transmission and to eliminate the need for hoses connecting the pump head and motor head. The porting block is also provided with a fluid flow bypass to allow an operator to push an associated vehicle without the hydraulic action of the fluid locking the wheels of the vehicle.

Further desirable features of a unified transmission of the type described herein include that, for certain embodiments the vehicle wheels may be mounted directly on output shafts of the transmission, while transmission driving wheels on opposite sides of the vehicle are driven in common by a single input shaft, also while providing for a gear reduction, as described above, internal of the transmission. This allows for a highly efficient use of and reduction in parts and for simplicity in the resulting vehicle. Alternatively, the transmission is sufficiently flexible that for some embodiments, the input shaft may be angled relative to the output shaft which can be accomplished by modification of the porting block between the pump head and the motor head of the transmission. In addition, an integral charge pump was determined to be desirable. The charge pump is driven by the imput shaft which provides makeup hydraulic fluid to the pump head while allowing circulation of the fluid for cooling and filtering.

OBJECTS OF THE INVENTION

Therefore, the objects of the present invention are: to provide a unified transmission adapted to variably transmit power from an input shaft to an output shaft and to alterntively reverse the output shaft through operation of a pair of cooperating heads including a driven rotating pump head and a motor head wherein hydraulic oil is circulated by the pump head so as to rotate and drive the motor head, consequently driving the output shaft; to provide such a transmission wherein various features normally found external of such a transmission are incorporated into the transmission; to provide such a transmission incorporating an internal return to neutral structure which biases the transmission to return to a neutral output should control levers associated with the transmission be released by an operator; to provide such a transmission which includes a positive neutral structure which requires that an operator expend additional energy as resistance and/or distance traveled by the control level in order to motivate the transmission from a neutral orientation thereof to a forward or reverse operation, as compared to simply motivating the transmission from one speed to a comparable differential speed in a given direction; to provide such a transmission which integrates a dampening structure to cooperate with a swash plate for smoothly adjusting the variable output of the transmission when changing speed, especially abrupt changes; to provide such a transmission wherein the dampening structure includes the ability to reduce jerking movement or excessive vibration in the output of the transmission when the operator is moving from one speed to another speed, but which allows the transmission to return to the neutral orientation thereof under the influence of the return to neutral structure; to provide such a transmission which has an integrated and internal gear reduction even at the full output of the transmission; to provide such a transmission having an integrated parking brake associated therewith; to provide such a transmission wherein the parking brake is automatically engaged upon the engine or prime mover of an associated vehicle stopping; to provide such a transmission wherein the parking brake includes a manual override to allow an operator to override the parking brake should the vehicle need to be moved in a situation wherein the engine is not operating; to provide such a transmission wherein the brake includes an apparatus to allow the operator to engage the brake even when the engine is operating, so that the operator may dismount from the vehicle; to provide such a transmission having an integrated porting block between the pump head and the motor head thereof so as to provide for efficient transfer of hydraulic fluid therebetween; to provide for such a transmission wherein the porting block incorporates valving to allow the relief of overpressure therefrom; to provide such a transmission wherein the porting block further includes a hydraulic fluid flow bypass mechanism which allows an operator to bypass the fluid around obstacles within its path when the engine is not operating so as to freely circulate within the transmission whereby there is no substantial blockage of the hydraulic fluid in the transmission preventing rotation of an associated wheel, such that an operator may push the vehicle or the like, even when the engine is not operating; to provide such a transmission including a charge pump for providing makeup hydraulic fluid to the porting block under pressure and to provide for circulation of the fluid for cooling and filtration; to provide such a transmission wherein the porting block incorporates relief mechanisms to prevent overpressure of the transmission; to provide such a transmission wherein the porting block includes a circulation mechanism which allows a slip stream of hydraulic fluid to continuously circulate through filter devices and cooling devices, so as to prevent overheating and degradation of the fluid; to provide such a transmission which allows direct mounting of a wheel on an output shaft thereof having an axis of rotation colinear with an input shaft thereof and which allows operation of a pair of such transmissions on opposed sides of a vehicle which are both driven by a single drive axle or input shaft; to provide such a transmission which can also be modified such that the input shaft and output shaft are at angles of less than 180° relative to one another; and to provide such a transmission which is relatively easy to manufacture, inexpensive to construct and especially well suited for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 4 is an enlarged, fragmentary and horizontal cross-sectional view of the transmission, taken through the center thereof and showing a swash plate thereof in a non-neutral orientation.

FIG. 5 is an enlarged cross-sectional view of the transmission, taken along line 5—5 of FIG. 4.

FIG. 6 is an enlarged and fragmentary cross-sectional view of the transmission, taken along line 6—6 of FIG. 4.

FIG. 7 is an enlarged and fragmentary cross-sectional view of the transmission, taken along line 7—7 of FIG. 4.

FIG. 8 is an enlarged and cross-sectional view of the transmission, illustrating the swash plate thereof in a neutral orientation.

FIG. 9 is a fragmentary and enlarged cross-sectional view of the transmission, taken along line 9—9 of FIG. 8.

FIG. 10 is an enlarged cross-sectional view of the transmission, taken along line 10—10 of FIG. 8.

FIG. 11 is an enlarged and fragmentary cross-sectional view of the transmission, taken along line 11—11 of FIG. 8.

FIG. 12 is an enlarged and fragmentary cross-sectional view of the transmission, taken along line 12—12 of FIG. 8.

FIG. 16 is an enlarged and fragmentary cross-sectional view of one face of the porting block of the transmission, taken along line 16—16 of FIG. 4.

FIG. 17 is a highly schematic view of the hydraulic fluid flow through the transmission.

DETAILED DESCRIPTION OF THE INVENTION

Figure 2:
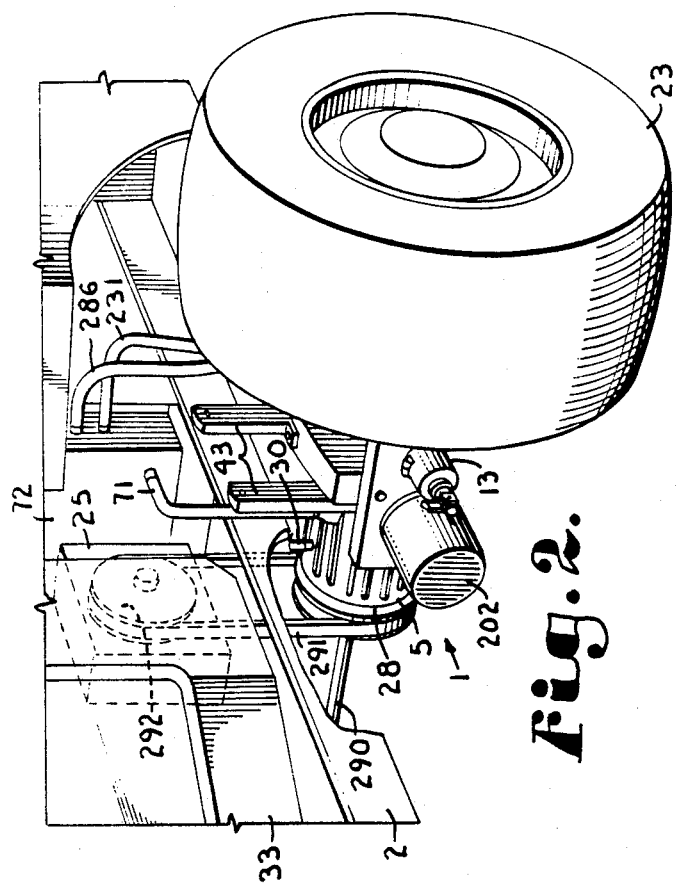
FIG. 2 is an enlarged and fragmentary perspective view of the mower, one of the rear wheels and a transmission associated therewith, internal portions thereof being shown in phantom.
Figure 3:
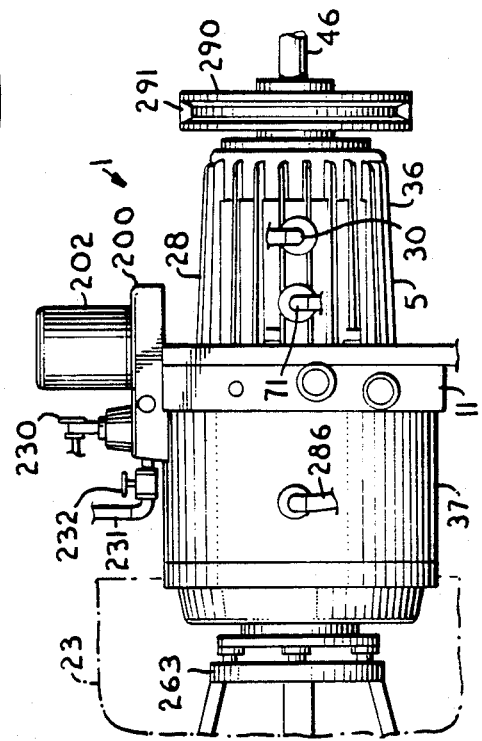
FIG. 3 is an enlarged and fragmentary top plan view of the transmission and a portion of a rear wheel mounting.
Figure 1:
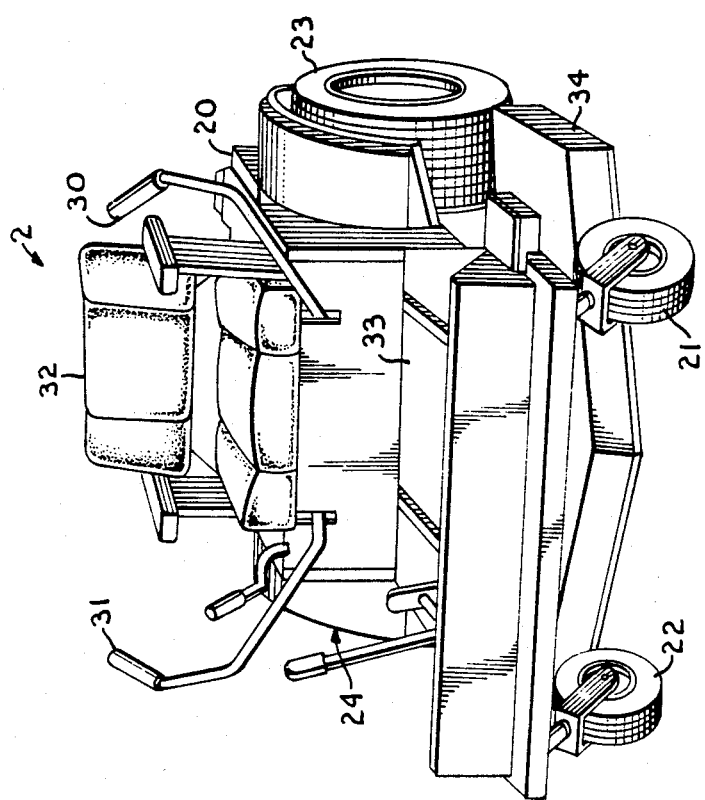
FIG. 1 is a perspective view of a lawnmower having a pair of rear drive wheels, each of the drive wheels being independently driven by a variable output transmission in accordance with the present invention.
Figure 15:
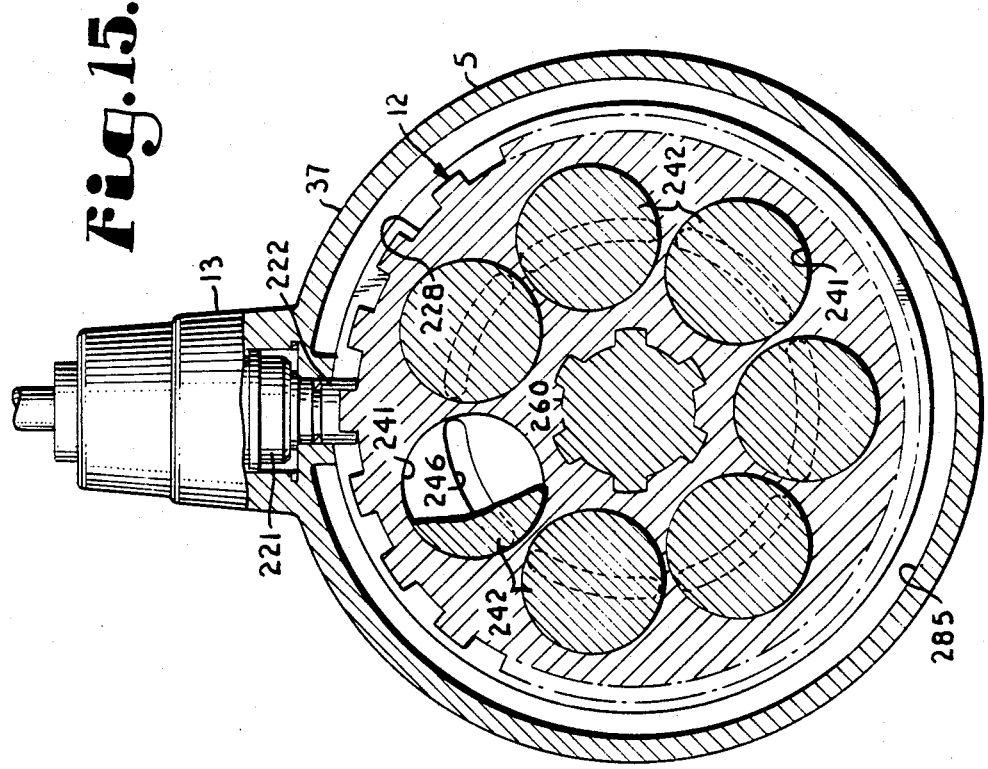
FIG. 15 is an enlarged cross-sectional view of the transmission, taken along line 15—15 of FIG. 4.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates a hydraulic transmission in accordance with the present invention. The hydraulic transmission 1 is illustrated in conjunction with a motorized vehicle 2 and in the illustrated embodiment, the vehicle is a zero turning radius mower.

The hydraulic transmission 1 comprises a housing 5, a charge pump 6, a wobble or swash plate 7, dampening means such as dampening mechanism 8, return to neutral means such as return to neutral mechanism 9, a hydraulic pump 10, a manifold plate or porting block 11, a hydraulic motor 12 and brake means such as parking brake mechanism 13.

The motorized vehicle 2 comprises a chassis 20 supported by a pair of front wheels 21 and 22 and a pair of driven rear wheels 23 and 24, a prime mover such as gasoline powered motor or engine 25. A hydraulic transmission 28 is provided for each rear wheel 23 and 24 with each transmission 28 controlled by left and right operator lever arms 30 and 31.

The mower vehicle 2 includes an operator's seat 32, a deck 33 and a mower housing 34 suspended under the deck 33 having a mower (not shown) operably driven by the engine 25.

The transmission housing 5 includes a pump side section 36 and a motor side section 37, each section 36 and 37 being effectively secured to the porting block 11 on opposite sides thereof by suitable bolts 39 or the like. The bolts 39 are received in appropriately positioned and threaded apertures 40 in the porting block 11 and pass through the sections 36 and 37. The exterior of the housing 5 includes heat transfer fins 42 at multiple locations spaced therearound. The housing 5 is attached to the mower deck 33 by a pair of brackets 43 bolted to the porting block 11.

In particular, with reference to FIG. 4, the pump side housing section 36 includes a charge pump end cap 44 at the end thereof opposite the porting block 11. The end cap 44 has a centrally located aperture sized to receive a drive or input shaft 46 which is mounted therein on bearings 47.

In the end of the housing section 36 facing the end cap 44 is a charge pump seat 49. Positioned within the seat 49 is a hydraulic oil charge pump 50. The particular charge pump 50 illustrated is a type of pump having an outer ring 53 with radially inwardly projecting lobes 54 and an inner ring 55 with radially outwardly projecting lobes 56 (sometimes referred to as a gerotor). It is noted that other type fluid pumps function for this purpose. The number of inner ring lobes 56 is one less than the number of outer ring lobes 54. The inner ring 55 is rotated by the shaft 46. This type of charge pump 50 is of a type produced by the Nichols/Portland Company. The purpose of the charge pump 50 is to produce pressurized hydraulic fluid to replenish leakage from the pump 10, motor 12 and recirculation from the porting block 11. Fluid is drawn from the interior of the pump side housing section 36 which functions as a reservoir 57 through a kidney-shaped slot 58 in the bottom of the pump seat 49, as can be seen in FIG. 6. The slot 58 in turn communicates with an interior 59 of the housing section 36 and, in particular, the reservoir 57 through bores or channels 60 and 61.

The high pressure fluid discharged by the charge pump 50 passes through a second kidney-shaped slot 63, also in the floor of the pump seat 49. The slot 63 in turn communicates with a conduit 64 which further in turn flow intersects with a second conduit 65. The second conduit 65 generally extends axially along the side of the entire length of the housing section 36 and is surrounded by an interior ridge 66 of the housing section 36.

With reference to FIG. 12, positioned near the end of the housing section 36 attached to the porting block 11, are a pair of diagonally opposed threaded apertures 68 and 69. Depending upon which side of the vehicle 2 the transmission 1 is used, the lower aperture 69 is plugged by a suitable threaded plug 70 and the upper aperture is threadably attached to a hose or conduit 71. The conduit 71 is attached at an opposite end thereof to a hydraulic oil or fluid reservoir 72 mounted on the vehicle 2. In this manner, fluid flows by gravity from the reservoir 72 through the conduit 71 into the housing pump section reservoir 57 so as to maintain the pump section interior 59 substantially completely full of fluid at all times.

The swash plate 7 is rotatably mounted on a suitable bifurcated shaft 75 which extends at opposite coaxial ends thereof through sealed openings 76 and 77 with bearings mounted therein at diagonally opposite locations in the side of the housing section 36. The shaft 75 is in turn connected with one of the operator lever arms either 30 or 31 depending upon which side of the vehicle 2 the particular transmission 1 is located. Movement of the operator lever arms 30 and 31 in turn rotates a respective shaft 75 so as to rock or pivot the associated swash plate 7 back and forth about the axis of the shaft 75.

The swash plate 7 has a neutral orientation seen in FIG. 8 and an infinite number of non-neutral orientations, one of which is seen in FIG. 4. The swash plate 7 has a rear surface section 88 which is generally planar. The surface section 88 and bearing surface 87 are both generally perpendicular to an axis of rotation of the support shaft 46 when the swash plate 7 is in the neutral orientation thereof.

The swash plate 7 includes a generally circular main plate or member 80 which has a diameter slightly smaller than the interior diameter of the housing section 36. The main member 80 is connected to the shaft 75 by trunnion portions 81 and 82 (see FIG. 10) which are secured to the shaft 75 by double roll pins 83 and 84 received in apertures through the plate 7 and shaft 75. The swash plate main member 80 has an interior seat 85 which generally faces the porting block 11 and hydraulic pump 10. Mounted in the seat 85 is an annular thrust washer 86 having the bearing surface 87 thereon also facing the porting block 11. In order to avoid passing through the center of the main drive shaft 46, the swash plate shaft 75 split into two coaxial sections and the main member 80 has a central opening 89 therein.

The dampening mechanism 8 of the illustrated embodiment comprises the dampening pistons 90 and 91. The purpose of the dampening pistons 90 and 91 is to reduce the jerking motion sometimes associated with hydrostatic transmissions 1.

The dampening mechanism 8 includes the pair of generally axially aligned pistons 90 and 91 mounted on diagonally opposite sides of the tilting portion of the swash plate 7 having the greatest amount of possible movement. The pistons 90 and 91 are reciprocably positioned in bores or receivers 92 and 93 formed in the wall of the housing section 36. The diameter of each of the pistons 90 and 91 is slightly smaller than the diameter of a respective receiver 92 or 93. The pistons 90 and 91 are also spring biased by compression springs 94 and 95 respectively toward the swash plate 7.

Each of the pistons 90 and 91 has a head 96 riding on the plate 7 and is interiorly hollow. In each of the pistons 90 and 91, the springs 94 and 95 are mounted interiorly of the piston 90 or 91 and are aligned axially therewith, seating on the face of the end cap 44 on one side thereof and seating on piston lips 97 on the opposite side. An axially aligned opening 98 is positioned through each of the piston heads 96. Interior of each of the openings 98 is a check valve type ball 99 having a diameter larger than the respective opening 98. The balls 99 function to allow fluid from the reservoir 57 of the housing section 36 to easily enter the interior of a respective piston, but effectively block the opening 98 when the fluid tries to exit from the interior of a respective piston 90 or 91. In this manner, oil must pass around the exterior of a respective piston 90 or 91 through a restrictive channel 101 in order for the piston to become compressed against the respective spring 94 or 95. This effectively dampens movement of the swash plate 7 to an orientation that would change.

In particular, swash plate 7 effectively abuts against the pistons 90 and 91 on opposite sides thereof. In order for one of the outer flaps of the swash plate 7 to be rotated toward the end cap 44 (for example, end 104 in FIG. 4), one of the pistons 90 or 91 (here piston 91) must become compressed against the respective spring 94 or 95. Since the fluid takes a period of time to flow around the outside of the piston 90 or 91, because of the close tolerance between the pistons 90 and 91 and the respective receivers 92 and 93 due to resistance or restrictive shear forces. This somewhat dampens the movement of the swash plate 7 into a position which would create a change in speed speed, as will be described later. On the other hand, flow of fluid into each of the pistons 90 and 91 is relatively unimpeded through the openings 98 such that when the swash plate 7 is urged away from a particular piston, the respective spring quickly urges the piston again against the swash plate surface 88. the pistons 90 and 91 ride on the edges of grooves 108 and 109 on the back of the swash plate 7 so as to produce two points of contacts between each piston 90 and 91 and the swash plate 7. The pistons 90 and 91 also ride slightly higher than the bottom of the grooves 108 and 109 such that flow of fluid into the piston openings 98 is not impaired substantially by the plate 7.

The return to neutral mechanism 9 comprises a biased plate 102. The plate 102 has a swash plate engaging surface 103 and is a lower portion of an annular sleeve 105 which generally and slidably surrounds a portion of the drive shaft 46. Mounted interior of the sleeve 105 is a compression spring 106. The spring seats at one end thereof against an inner surface of the housing section 36 and at an opposite end thereof against a surface 107 of the sleeve 105 opposite the surface 103. The surface 103 is generally planar and perpendicularly aligned relative to the axis of the drive shaft 46. The surface 103 extends from near the shaft 46 substantially radially outward therefrom and defines a lever arm 109 (identified by brackets in FIG. 8) between the center of the shaft 46 and a periphery 110 of the surface 103.

Whenever the swash plate 7 is in a position wherein the rear surface 100 is not perpendicularly aligned relative to the axis of the drive shaft 46, the return to neutral biasing plate 102 is continuously biased by means of the compression spring 106 to urge the swash plate surface 100 into such a position. That is, the spring 106 urges the surfaces 103 and 100 to be coplanar, as in FIG. 8 (neutral orientation), as compared to being non-coplanar, as in FIG. 4 (non-neutral orientation). In addition, the spring 106 provides a slight biasing force against the sleeve 103 and, consequently, urges the surface 102 against the surface 100 even when the swash plate surface 100 is generally perpendicular to the drive shaft 46. The swash plate 7 when in this perpendicular position, is also considered to be in a neutral position or orientation.

Because the return to neutral mechanism 9 continuously urges the swash plate 7 to return to this neutral position or orientation, an operator can remove his or her hands from the associated operator lever arm 30 or 31 and the respective hydrostatic transmission 1 will effectively immediately be urged into the neutral position which will effectively cease driving output of that particular transmission 1. This provides substantial convenience and safety to the operator. In addition, the operator must apply at least a slight force to the respective operating lever arm 30 or 31 (to overcome the spring biased lever arm 109) to motivate a respective transmission 1 from the neutral position or orientation thereof, because of the biasing action of the return to neutral mechanism 9. It is also noted that the outer diameter of the surface 103 effectively defines this lever arm 109 about which the swash plate surface 100 must be rotated.

The hydraulic pump 10 comprises a plurality of generally hollow hydraulically motivated pistons 112, slidably and axially movable along bores or receivers 113 radially positioned from the shaft 46 and circumferentially spaced about a pump head 115. The pump head 115 includes a grooving which mates with a similar grooving 138 along the drive shaft 46. In this manner, the pump head 115 and, consequently, the pistons 112 are positively rotated with the shaft 46. Each of the receivers 113 has an end bore or channel 119 joining therewith and opening onto the porting block 11, see especially FIG. 18. At an opposite end of each receiver 113, the receiver 113 is generally open and a respective piston 112 is able to reciprocate within the receiver 113. Each of the pistons 112 has a series of circumferential grooves thereon which tend to pick up hydraulic fluid to aid in lubricating the piston 112.

Located at an end of each of the pistons 112 opposite the respective channels 119 is a ball shaped head 120. Each of the heads 120 is mounted in a respective slidable shoe or foot 123 having a centrally located aperture 124 therein. The feet 123 slidably rotate or ride along the thrust washer bearing surface 87 during operation of the transmission 1. It is noted that, the pistons 112 reciprocate along their axis away from the porting block 11 due to a non-neutral orientation or positioning of the swash plate 7, while the pistons 112 are rotating. In this manner, an oil or fluid receiving chamber 127 is formed therein, as is seen with respect to the upper piston 112 in FIG. 4. When the pistons 112 reciprocate toward the porting block 11, as is seen with respect to the lower piston 112 in FIG. 4, the fluid receiving chamber 127 is significantly diminished and fluid is forced therefrom.

A lower surface 128 of the head 115 rides on and effectively seals with a first generally planar surface 129 of the manifold plate 11. A biasing spring 131 is mounted so as to bias at one end 132 thereof against the drive shaft 46 through pins supported by fixed ring 135 and at an opposite end thereof against a washer 134 which is slidable with respect to the shaft 46 but which is secured to the head 115. In this manner, the surface 128 of the head 115 is effectively biased against the porting block face 129 so as to create an effective seal therewith. The pump head face 128 has a channel network 136, as seen in FIG. 9, which aids in lubrication of the pump head 115 relative to the porting block surface 129.

The porting block 11 includes a seat 137 for receiving one end of the drive shaft 46 centrally located in the face 129. A set of roller bearings 138 is positioned within the seat 137 so as to surround the shaft 46 and provide bearing support therebetween.

The porting block 11 is a relatively thin plate of slightly greater width than the housing 5 and having a plurality of channels and conduits formed therein. These channels and conduits direct the flow of hydraulic fluid between the charge pump conduit 65, the hydraulic pump 10, the hydraulic motor 12 and the brake mechanism 13, as well as to the reservoir 72, while also providing for the safe release of overpressure and the release of hydraulic tension when it is desired to push the vehicle 2 without operation of the transmission 1.

Figure 13:
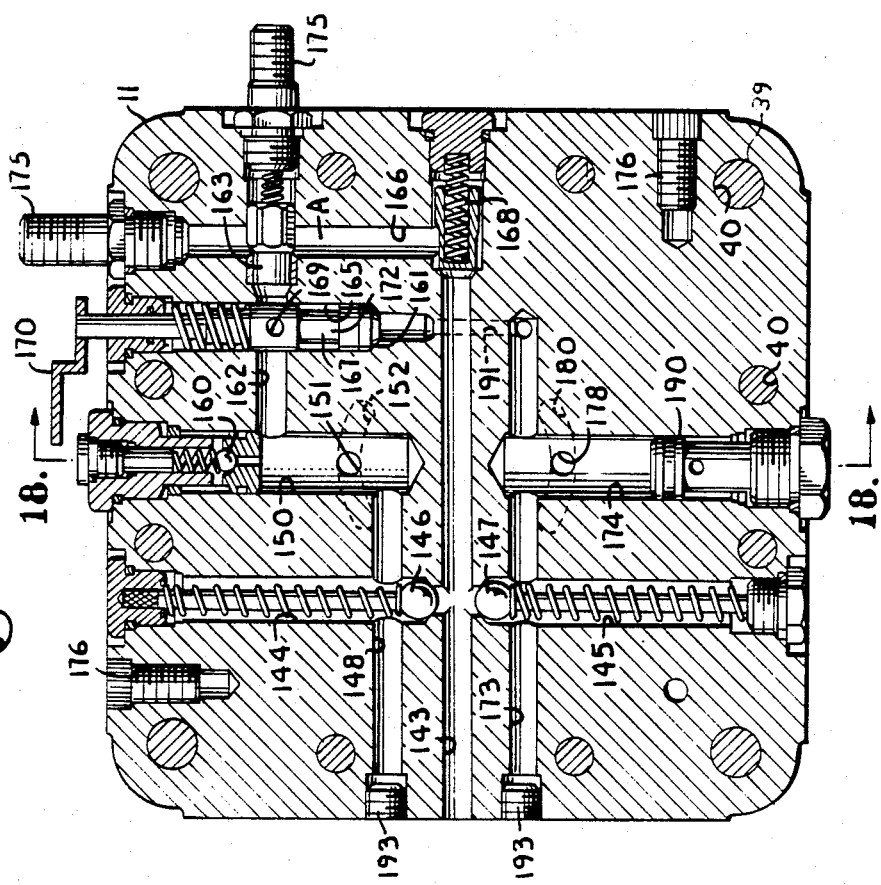
FIG. 13 is an enlarged cross-sectional view of a porting plate of the transmission, taken along line 13—13 of FIG. 4.
Figure 18:
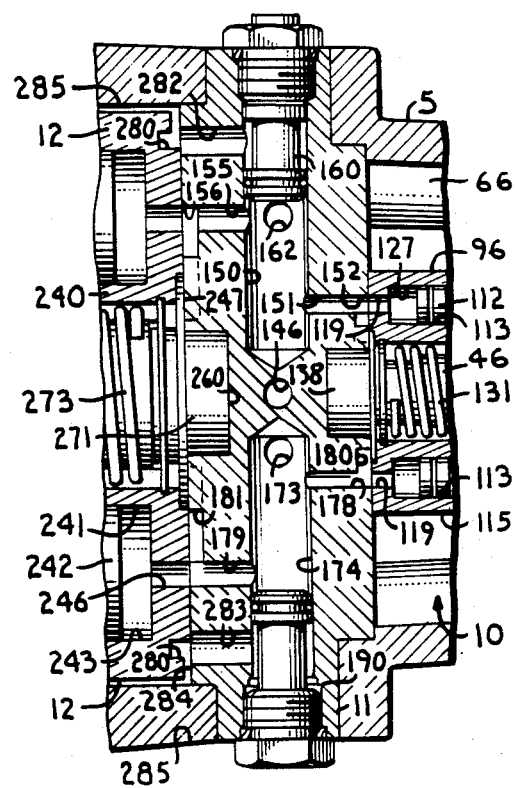
FIG. 18 is an enlarged and fragmentary cross-sectional view of the transmission, taken along line 18—18 of FIG. 13.
Figure 14:
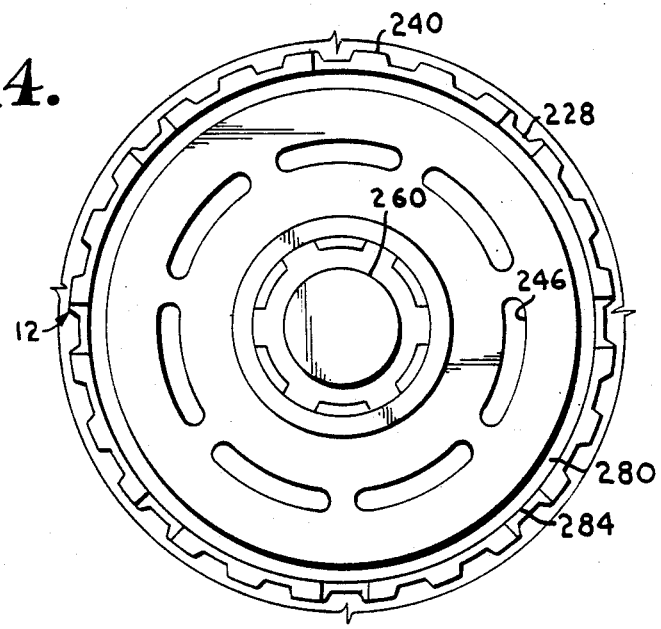
FIG. 14 is an enlarged bottom view of the motor housing, taken along line 14—14 of FIG. 4.

In particular, attention is directed to FIGS. 4, 13 and 18 as well as the schematic diagram of FIG. 17 which generally outlines the various flows of fluid throughout the transmission 1. The porting block 11 includes a first conduit 140 which communicates at one end thereof with the charge pump conduit 65 so as to receive pressurized fluid therefrom. As with virtually all of the interconnections between conduits on opposing plates or housings, there is an O-ring seal 141 positioned between the conduit 140 and the conduit 65.

The porting block 11 also includes a central distribution channel 143 passing generally axially therethrough and generally perpendicular to the axis of the main drive shaft 46. A pair of side conduits 144 and 145 are joined with the channel 143. Check valves 146 and 147 are positioned within each of the side conduits 144 and 145 respectively to allow flow of fluid from the channel 143 into the respective side conduits 144 and 145, but to prevent flow of fluid in the opposite direction.

The side conduit 144 functions to provide fluid to the hydraulic pump 10 when the vehicle 2 is operating in a forward direction and the side conduit 145 provides fluid to the hydraulic pump 10 when the vehicle 2 is operating in a reverse direction. The side conduit 144 flow connects with a T conduit 148 which, in turn, interconnects with another conduit 150 which is generally radially positioned with respect to the porting block 11. The conduit 150, in turn, connects with bore or port 151 on one side thereof which generally connects with a kidney shaped slot 152 on the face 129 which, in turn, aligns with the hydraulic pump channels 119 that tend to be associated with relatively open chambers 127 when the swash plate 7 is in a forward operating position, such as is illustrated by the upper chamber 127 in FIG. 4. When the swash plate 7 is in a reverse operating orientation, the upper chamber 127 in FIG. 4 would be virtually nonexistent and the lower chamber 127 would be relatively large.

The conduit 150 also opens on an opposite side thereof as compared with the port 151 to a second port 155 (see FIG. 18). The second port 155, in turn, communicates with a slot 156. The slot 156, in turn, communicates with the hydraulic motor 12 as will be discussed later. The conduit 150 also has at one end thereof a high pressure relief valve 160 which is preferably designed to relieve at approximately 3,000 pounds per square inch. The conduit 150 further communicates with another conduit 162 also having a relief valve 163 designed to relieve at approximately 50 pounds per square inch positioned therein. The conduit 162 communicates with cross-channels 165 and 166. The cross-channel 165 has positioned therein a spring biased spool 167 having an aperture 169 therethrough which may be manipulated by means of a lever 170 attached to the spool 167 by an operator to place the aperture 169 in line with the conduit 162 so as to bypass substantially all of the fluid flowing through channel 148 into the cross-channel 166 which is in turn in communication with a channel 171 (see FIG. 4) at the location marked by the reference letter A in FIG. 13. The channel 171 opens into the hydraulic motor 12 so as to relieve tension upon the pressurized hydraulic fluid system and allow the vehicle 2 to be pushed without the transmission 1 operating, when the port 169 is aligned with the conduit 162. The spool 167 is also connected by small cross-channel 191 to channel 173. When operating in a forward orientation high pressure fluid in channel 173 communicates with a head 161 of the spool 167 through channel 191 to place a relatively narrow portion 172 of the spool 167 in alignment with the channel 162 such that a relatively small amount of fluid bypasses the motor 12 continuously so as to allow for cooling and filtering of fluid. The cross-channel 166 is also connected at one end thereof to the channel 143 by means of a third pressure relief valve 168 which has a relieving pressure of approximately 70 pounds per square inch. The other end of the cross-channel 166 is plugged but has extending therefrom a threaded stud 175 associated with a similar stud 175 attached to the outside of the valve 163 and which cooperates in conjunction with threaded bores 176 in faces of the block 11 to allow the transmission 1 to be mounted on the vehicle 2.

The side conduit 145 is likewise connected to a first conduit 173 which is, in turn, connected to a conduit 174. The conduit 174 is connected to ports 178 and 179 which are similarly positioned as compared to ports 155 and 151. The ports 178 and 179, in turn, flow communicate with kidney shaped slots 180 and 181 respectively. The slot 180 is positioned so as to receive fluid discharged from the pump head channels 119 when the swash plate 7 is in a forward operating orientation thereof, such as is shown in FIG. 4. The kidney shaped slot 181 is positioned so as to deliver fluid transferred by the hydraulic pump 10 to the hydraulic motor 11. Also positioned within the conduit 174 is a high pressure relief valve 190 which is designed to relieve at approximately 3,000 pounds per square inch. The ends of the conduits 173 and 148, to the left as seen in FIG. 13, are plugged by countersunk plugs 193.

A side plate 200, see in FIG. 4, is fixedly secured to one end of the porting block 11 by bolts or the like. The side plate 200 includes an incoming flow conduit 201 which effectively receives flow from conduit 140 and transfers same to a filter element 202. Fluid flow passes through the filter element and is collected by a standpipe 204 through which the fluid exits the filter element 202 into an outflow conduit 203 which is flow communicated with the channel 143 of the porting block 11.

The outflow conduit 203 also communicates with the brake mechanism 13 through a restrictive orifice 205. The brake mechanism 13 includes a housing 210 having an inner chamber 211 within which is reciprocably mounted a plunger 212 which is, in turn, biased by a spring 213 positioned at one end thereof against the back of the housing 210 and at an opposite end thereof against the plunger 212.

The plunger 212 has a sealing periphery 220 relative to the housing 210 on an inner head 221 with an outwardly projecting lug 222 thereon. The lug 222 also projects radially inward toward the motor 12. The head 221 seals within the inner bore or chamber 211 around the sealing periphery. The plunger 212 also has a seal 224 effectively sealing between the housing 210 and a plunger shaft 214 at the end of the shaft 214 opposite the lug 222. The end of the head 221 near the lug 222 is substantially smaller in diameter than the inner diameter of the brake housing 210 at that location so as to form an inner chamber 226. The chamber 226 is in flow communication with the orifice 205 such that, when the conduit 203 is pressurized with fluid, the fluid flows through the orifice 205 into the chamber 226 and effectively biases the brake mechanism head 221 and, consequently, the lug 222 radially outward.

When fluid pressure is removed from the conduit 203, the fluid in the chamber 226 bleeds back through the orifice 205 and the spring 213 biases the head 221 and, consequently, the lug 222 radially inward. The lug 222, when positioned radially inward, engages slots 228 on the surface of the hydraulic motor 12 which effectively prevents rotation of the hydraulic motor 12. The plunger shaft 214 has positioned thereon a manual override lever 230. By means of the lever 230, the brake mechanism 13 may be disengaged should an operator need to push or otherwise move the vehicle 2 by biasing the lug 232 upward against the spring 213. A bypass conduit 231 also flow connects with chamber 226. The conduit 231 has an intermediate valve 232 and connects with the reservoir 72. The interior flow channel of the conduit 231 and the valve 232, when open, is much larger than the orifice 205, such that, when the valve 232 is opened, fluid flows from the chamber 226 and cannot be replenished through the orifice 205 quickly enough to hold the brake mechanism 13 in a non-braking configuration. The lug 222, therefore, engages and locks into one of the slots 228, thereby engaging the brake 13 even when the engine 25 is operating.

The hydraulic motor 12 includes a rotary head 240 having a plurality of axially aligned and circumferentially spaced bores or receivers 241 with each receiver 241 having positioned therein a reciprocating piston 242. The pistons 242, when in a raised position within a respective receiver 241, form a fluid receiving chamber 243 therein. The chambers 243, as well as the receivers 241, have a lower bore or channel 246 associated therewith which communicates with a respective receiver 241 and opens onto a second face 247 of the porting block 11 as well as a face 248 of the motor head 240, so as to be in alignment with the slots 156 and 181 at some time during rotation of the head 240. In this manner, fluid may flow into the receiver 241 from the respective slots 156 and 181 depending upon whether or not the swash plate 7 is set in a reverse orientation or in a forward orientation thereof. Each of the pistons 242 have an upper end 250 which effectively rides on a race or heavy thrust washer 251 which, in turn, rides on generally axial thrust bearings 252 and radial thrust bearings 253. The angle or attitude of a lower surface 254 of the thrust washer 251 is fixed in angular relationship with respect to the axis of the drive shaft 46 at other than 90°.

The slots 156 and 181 are aligned with respect to the thrust under 251 such that the pistons 242 are spaced at an angle of about 23° from the lowest side of the thrust washer 251 (top as seen in FIG. 4), when the channel 246 associated with such a piston 242 comes into alignment with one of the slots 156 or 181 (see FIG. 16). In this manner, fluid entering the piston channels 246 through slot 181 drives the motor head 240 in a forward direction and, if fluid is more pressurized in slot 156, the motor 240 is rotated in reverse. Fluid flows, relative to the motor head 240, in the forward direction are shown in solid lines in FIG. 17 and fluid flows in a reverse direction as shown in dashed lines. Fluid, after driving the motor head 240 to rotate, exits through the opposite slot either 156 or 181 as compared to where it had entered. In this manner, fluid circulates from the discharge of the motor head 240 to the suction of the pump head 115.

A power takeoff shaft 260 is axially aligned with the drive shaft 46 and is secured by slotting or the like so as to rotate with the motor head 240. The shaft 260 extends outwardly from the housing 5 at a first end 262 thereof and is effectively attached to a hub 263 of one of the rear tires 23. Near the shaft first end 262, the shaft 260 is supported within the housing 1 by bearings 265 and fluid is effectively prevented from flowing between the housing 5 and the shaft 260 by a seal 266. The opposite end 269 is positioned within a seat 270 which is centrally located in the plate member face 247. The shaft end 269 is mounted in bearings 271 within the seat 270. A compression spring 273 is wrapped about the shaft 260 and biases at one end thereof against a portion of a ridge 274 attached to the shaft 260 and against a shelf 275 of the head 240 at an opposite end thereof so as to effectively bias the head 240 into contact with the plate member surface 247 and prevent leakage therebetween. A circumferential groove 280 is positioned on the plate member engaging surface of the head 240 near a radially outward region thereof. The groove 280 communicates with conduits 171, 282 and 283 in the porting block 11 so as to be effectively aligned with the high pressure relief valves 190 and 160 during the rotation of the head 240 and to receive flow from conduit 166 through conduit 171. The groove 280 communicates through a plurality of slots 284 with an interior chamber 285 surrounding the motor head 240. The channels 285 openly and with relatively little restriction flow communicate through a bore 286 passing through the side of housing section 35 with the fluid reservoir 72. In this manner, fluid freely circulates from the motor housing section 37 to the reservoir 72.

The drive shaft 46 is preferably a continuous shaft connecting both transmissions 1 of the vehicle 2. However, it is foreseen that the shafts 46 may be separate, provided that separate drive means are provided for these shafts. In the illustrated embodiment, the drive or input shaft 46 includes a drive pulley 290 which is connected by a drive belt 291 to a pulley 292 which is directly driven by the motor 25.

It is noted that, although the illustrated embodiment is particularly effective in transferring power along colinear axes of the drive shaft 46 and wheel 23, it is possible that the porting block could be replaced by a manifold, for example, wherein the axis of the drive shaft 46 would be aligned at a 90° angle to the axis of the power takeoff shaft 260. Likewise, in some instances, the block, although not as efficiently, could be replaced with other devices for transferring fluid between the pump side and motor side of the transmission 1.

It is noted that the pistons 212 of the pump side are substantially smaller in diameter than the pistons 242 of the motor side. This has the effect of creating a substantial reduction in gearing without requiring other gear reduction apparatus. In this specific embodiment illustrated, when the swash plate 7 is at the maximum tilt thereof, the gear reduction is approximately 16.7 to 1. When the angle of the swash plate 7 becomes closer to being perpendicular to the axis of the drive shaft 46, this gear reduction increases significantly.

It is to be understood that while certain forms of the present invention have been illustrated and described herein, it is not to be limited to the specific forms or arrangement of parts described and shown.

What is claimed and desired to be secured by Letter Patent is as follows:

1. In a hydraulic transmission wherein an input shaft rotates a pump head having a variable hydraulic fluid output and wherein the fluid output of the pump head in turn rotates a motor head which is connected to an output shaft; the improvement comprising:
    (a) parking brake means communicating with hydraulic fluid flow associated with rotation of said input shaft such as to apply a brake to effectively and postively stop rotation of said output shaft when said input shaft is not rotating; said brake means including:
    (b) a plunger movable along a major axis thereof;
    (c) a brake member comprising a lug connected to one side of said plunger;
    (d) biasing means normally biasing said plunger and consequently said brake member into a braking configuration thereof; and
    (e) said output shaft has secured thereto an axially aligned groove; said lug being aligned to move radially inward and outward relative to said motor head and further being aligned to engage said groove when said lug is positioned radially inward.
2. The transmission according the claim 1 wherein:
    (a) said braking means is fully integrated within said transmission.
3. The transmission according to claim 1 including:
    (a) an override mechanism to allow an operator of said transmission to apply said brake when said input shaft is rotating.
4. The transmission according to claim 3 wherein:
    (a) said braking means include a head reciprocably and sealably received within a bore having said brake positioned on one side of said head and including biasing means on an opposite side of said head for continuously urging said brake into a braking configuration thereof; and including:
    (b) a chamber formed within said bore on the side of said head associated with said brake; and
    (c) said chamber communicating with said fluid such that when said fluid is pressurized by rotation of said input shaft, said fluid flows into said chamber and urges said head so as to overcome the biasing pressure of said biasing means, thereby placing said brake in a non-braking configuration thereof.
5. The transmission according to claim 4 including:
    (a) an orifice effectively positioned between said chamber and the fluid pressurized by rotation of said input shaft.
6. The transmission according to claim 1 including:
    (a) a braking override mechanism to allow an operator to selectively position said brake in a non-braking configuration thereof, when said braking means would normally place said brake in a braking configuration thereof.
7. The transmission according to claim 6 wherein:
    (a) said braking override mechanism including an operator manipulative structure to allow the operator to overcome said biasing means and lock said braking means in a non-braking configuration thereof.
8. The transmission according to claim 1 wherein:
    (a) said plunger has an outer periphery and is received in a bore so as to sealably reciprocate within said bore.
9. The transmission according to claim 8 wherein:
    (a) said receiver includes a chamber positioned within said receiver and associated with one side of said plunger; said chamber being flow connected with pressurized fluid from said transmission so as to bias said plunger against said biasing means when there is pressurized fluid within said transmission, thereby placing said braking member in a non-braking configuration thereof.

10. The transmission according to claim 9 wherein:
(a) said biasing means comprises a compression spring positioned to bias against said plunger on a side thereof opposite said braking member.

11. The transmission according to claim 1 including:
(a) a charge pump for pressurizing hydraulic fluid within said transmission; said charge pump being activated by rotation of said input shaft such that pressurized hydraulic fluid is produced within said transmission upon rotation of said input shaft; and,
(b) said fluid pressurized by said charge pump being communicated with said braking means so as to operably maintain said braking means in a non-braking configuration thereof under normal operating conditions.

12. In a hydraulic transmission wherein an input shaft rotates a pump head and hydraulic fluid from the pump head in turn rotates a hydraulic motor attached to an output shaft; the improvement comprising:
(a) a porting block for communicating fluid flow between said pump and said motor; said porting block having a first common channel, a second forward direction channel and a third reverse direction channel; said common channel being connected with said forward and reverse channels by respective check valves allowing flow from said common channel into each of said forward and reverse channels and preventing flow in an opposite direction; said forward channel including ports to communicate with said pump head and said motor such that when said pump head is pumping in a forward configuration thereof, fluid is drawn from said forward channel and, when said pump head is pumping in a reverse configuration thereof, fluid is drawn from said reverse channel; also when said pump head is pumping in the forward configuration thereof, said pump head discharges fluid into said reverse channel which pressurizes said reverse channel and activates said motor to rotate in a forward direction, whereas when said pump head is in a reverse configuration thereof, fluid is discharged from said pump head into said forward channel which communicates with said motor so as to drive said motor in reverse; and
(b) said motor discharging fluid into said forward channel when said pump head is in the forward configuration thereof and said motor discharging fluid into said reverse channel when the pump head is in the reverse configuration thereof.

13. The transmission according to claim 12 wherein:
(a) said forward channel communicates with a hydraulic fluid reservoir; and
(b) flow through said forward channel to said reservoir is effectively controlled by a bypass valve positioned therebetween; said bypass valve allowing a slip stream of fluid to flow from said forward conduit to said reservoir when said pump head is in a forward configuration thereof.

14. The transmission according to claim 13 including:
(a) a charge pump operably activated by rotation of said input shaft so as to produce pressurized hydraulic fluid; said pressurized hydraulic fluid being communicated with said portion block common conduit so as to provide makeup fluid thereto; and
(b) wherein said reservoir is in flow communication with said charge pump such that said charge pump draws fluid from said reservoir.

15. In a hydraulic transmission wherein an input shaft rotates a pump head having a variable hydraulic fluid output and wherein the fluid output of the pump head in turn rotates a motor head which is connected to an output shaft; the improvement comprising:
(a) automatic parking brake means communicating with hydraulic fluid flow associated with rotation of said input shaft such as to apply a brake to effectively and positively stop rotation of said output shaft when said input shaft is not rotating; and including:
(b) an override mechanism to allow an operator of said transmission to position said brake in a non-braking configuration thereof when said input shaft is not rotating;
(c) said brake means include a head reciprocably and sealably received within a bore having said brake positioned on one side of said head and including biasing means on an opposite side of said head for continuously urging said brake toward a braking configuration thereof;
(d) a chamber formed within said bore on the side of said head associated with said brake; and
(e) said chamber communicating with said fluid such that when said fluid in said chamber is pressurized by rotation of said input shaft, said fluid flows into said chamber and urges said head so as to overcome the biasing pressure of said biasing means, thereby placing said brake in the non-braking configuration thereof;
(f) an orifice effectively positioned between said chamber and the fluid pressurized by rotation of said input shaft;
(g) a conduit flow connecting with said chamber and having positioned therealong a valve;
(h) said conduit discharging fluid therefrom when said valve is open to a location of relatively low pressure as compared to fluid pressurized by rotation of said input shaft;
(i) and said valve and said conduit having a flow capacity substantially greater than said orifice such that when said valve is opened, even when said input shaft is rotating, pressurized fluid is bled from said chamber thereby allowing said biasing means to urge said brake into the braking configuration thereof.

16. In a hydraulic transmission wherein an input shaft rotates a pump head having a variable hydraulic fluid output and wherein the fluid output of the pump head in turn rotates a motor head which is connected to an output shaft; the improvement comprising:
(a) automatic parking brake means communicating with hydraulic fluid flow associated with rotation of said input shaft such as to apply a brake to effectively and positively stop rotation of said output shaft when said input shaft is not rotating;
(b) a braking override mechanism to allow an operator to selectively position said brake in a non-braking configuration thereof, when said braking means would normally place said brake in a braking configuration thereof;
(c) said braking override mechanism incuding an operator manipulative structure to allow the operator to overcome said biasing means and lock said braking means in a non-braking configuration thereof;

(d) a porting block having a plurality of fluid channels therein; said channels providing for flow of hyraulic fluid between the pump head and the motor head in both a forward configuration and a reverse configuration thereof; said channels including control and operational structure effectively obstructing free flow of hydraulic fluid through said channels when said pump head is not rotating; and (e) fluid flow bypass means cooperating with said brake override mechanism to allow fluid within said porting block to freely circulate and thereby allow free movement of the output shaft of said transmission so as to allow an operator to easily turn the output shaft, even when said input shaft is not rotating.

17. In a hydraulic transmission wherein an input shaft rotates a pump head having a variable hydraulic fluid output and wherein the fluid output of the pump head in turn rotates a motor head which is connected to an output shaft; the improvement comprising:

(a) automatic parking brake means communicating with hydraulic fluid flow associated with rotation of said input shaft such as to apply a brake to effectively and positively stop rotation of said output shaft when said input shaft is not rotating;

(b) a plunger having an outer periphery and being received in a bore so as to sealably reciprocate within said bore;

(c) a brake member attached to one side of said plunger;

(d) biasing means biasing said plunger and consequently said brake member into a braking configuration thereof;

(e) said receiver includes a chamber positioned within said receiver and associated with one side of said plunger; said chamber being flow connected with pressurized fluid from said transmission so as to bias said plunger against said biasing means when there is pressurized fluid within said transmission, thereby placing said braking member in a non-braking configuration thereof;

(f) said biasing means comprise a compression spring positioned to bias against said plunger on a side thereof opposite said braking member;

(g) said braking member comprises a lug extending outward from said receiver; and (h) said motor head includes near a periphery thereof an axially aligned groove; said lug being aligned to move radially inward and outward relative to said motor head and further being aligned to engage said groove when said lug is positioned radially inward.

18. In a hydraulic transmission wherein hydraulic fluid is exchanged between a driven pump head and a motor head which is subsequently driven by the fluid received from and circulated back to said pump head and wherein said pump head is operably rotated by an input shaft; the improvement comprising:

(a) a charge pump operably motivated by rotation of said input shaft and providing pressurized hydraulic fluid in flow communication with hydraulic fluid circulated between said pump head and said motor head such that said charge pump replenishes any fluid lost by leakage between said pump head and said motor head or bypassed therefrom;

(b) bypass means allowing a slip strem of fluid circulating between said pump head and said motor head to circulate to said charge pump so as to allow for cooling;

(c) said transmission includes a porting block having a series of channels therein flow communicating fluid between said pump head and said motor head; and (d) said bypass means includes an integral valve positioned within said porting block and opened by a positive circulation of fluid between said pump head and said motor head such that said valve releases said slip stream from said channels thereby allowing cooling of said slip stream.

19. In a hydraulic transmission wherein an input shaft rotates a pump head having a variable hydraulic fluid output and wherein the fluid output of the pump head in turn rotates a motor head which is connected to an output shaft; the improvement comprising:

(a) parking brake means communicating with hydraulic fluid flow associated with rotation of said input shaft such as to apply a brake to effectively and positively stop rotation of said output shaft when said input shaft is not rotating; and wherein:

(b) said brake means include a plunger head reciprocably and sealably received within a bore having said brake positioned on one side of said plunger head and including biasing means on an opposite side of said plunger head for continuously urging said brake into a braking configuration thereof;

(c) a chamber formed within said bore on the side of said plunger head associated with said brake; and (d) said chamber communicating with said fluid such that when the fluid in said chamber is pressurized by rotation of said input shaft, said fluid flows into said chamber and urges said plunger head so as to overcome the biasing pressure of said biasing means, thereby placing said brake in a non-braking configuration thereof;

(e) an orifice effectively positioned between said chamber and the fluid pressurized by rotation of said input shaft;

(f) a conduit flow connecting with said chamber and having positioned therealong a valve;

(g) said conduit discharging fluid therefrom when said valve is open to a location of relatively low presure as compared to fluid pressurized by rotation of said input shaft;

(h) and said valve and said conduit having a flow capacity substantially greater than said orifice such that when said valve is opened, even when said input shaft is rotating, pressurized fluid is bled from said chamber thereby allowing said biasing means to urge said brake into the braking configuration thereof.

* * * * *